Sept. 24, 1935.    J. L. ANDERSON    2,015,330
CUTTING OR WELDING MACHINE
Filed May 13, 1933    2 Sheets-Sheet 2
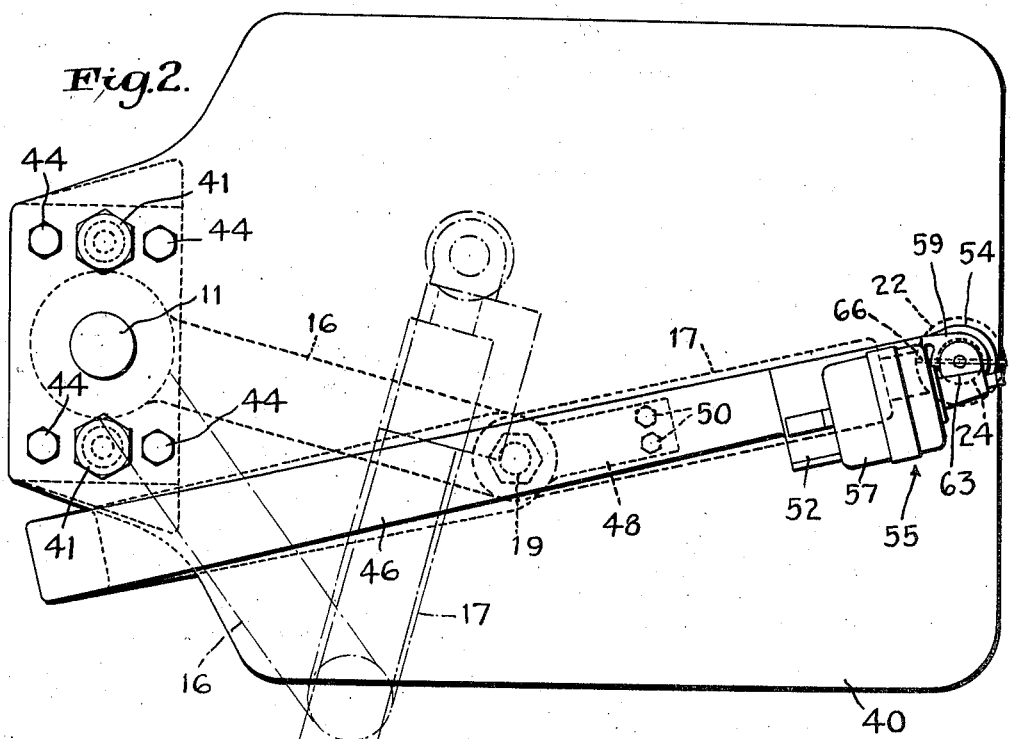
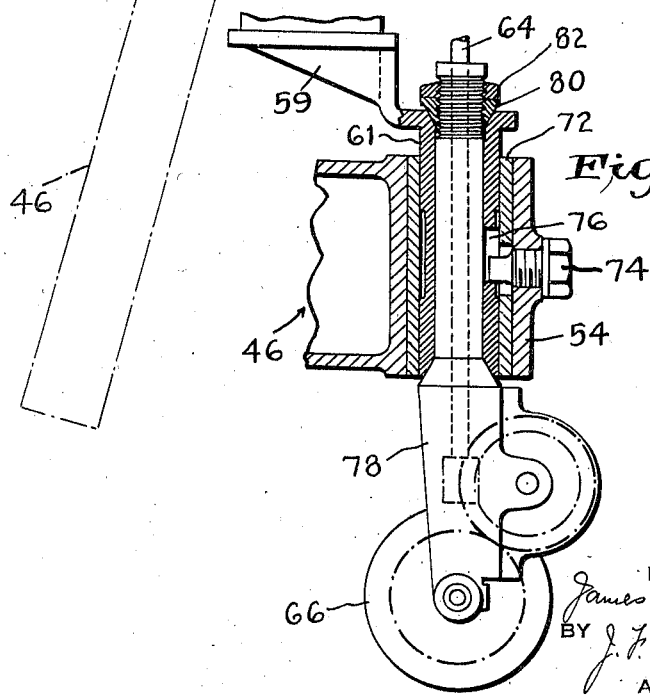
INVENTOR
James L. Anderson
BY J. F. Brandenburg
ATTORNEY Patented Sept. 24, 1935

2,015,330

UNITED STATES PATENT OFFICE 2,015,330

CUTTING OR WELDING MACHINE

James L. Anderson, Closter, N. J., assignor to Air Reduction Company, Incorporated, New York, N. Y., a corporation of New York Application May 13, 1933, Serial No. 670,848

6 Claims. (Cl. 266—23)

This invention relates to cutting or welding machines in which a thermal instrumentality, such as a torch, capable of cutting or welding metal, is supported for universal movement in a plane and is moved in accordance with a pattern by a motor-driven tracer or follower. More specifically, the invention relates to that class of such machines in which the tracer or follower is above the torch. Two types of this class of machine are known. In one, the driven tracer is a wheel which is guided by hand over a drawing placed on a pattern table which is supported at a level higher than the torch, whereas in the other type the tracer is an upwardly projecting template follower, preferably magnetic, which automatically follows an overhanging template.

One of the objects of this invention is to provide a machine or apparatus with which the advantages and capabilities of both of these types are made available in a simple and convenient manner. In accordance with the invention, the universally movable support for the torch is adapted to carry both a template follower and a drawing tracer, one above the other.

In order to carry the drawing tracer, the universally movable support is provided with an arm formed to extend over a pattern table.

Other objects of the invention are simplicity, convenience and compactness in respect to the manner of supporting the template and the pattern table. In accordance with this part of the invention, means are provided for supporting the template and the pattern table from the same column or standard on which the universally movable support is swung.

Another feature of the invention is applicable to machines capable of operating from a drawing, as well as to a machine which can work from either a drawing or a template. A known form of drawing tracer machine is one having a jointed arm composed of two sections, of which one section swings on a fixed pivot or column, while the other section, which is pivoted to the first, is in the form of a fork or yoke the members of which extend above and below the pattern table and carry the tracer and the torch, respectively. In such machines, the throat of the yoke has terminated at the elbow joint between the sections of the jointed arm. In the preferred embodiment of the present invention, the drawing tracer arm is attached or fixed to the outer section of a jointed arm and forms a throat to embrace the pattern table, but this throat extends well back of the elbow joint, so that in the operation of the machine the rear section of the elbow jointed arm passes under the table. Because of this novel construction, the pattern table can be supported from the main column of the machine, and the machine has an ample range of movement, for given lengths of sections of the jointed arm, without striking the edge of the table.

Other objects, features and advantages of the invention will appear or be pointed out as the specification proceeds.

In the accompanying drawings, forming part hereof:

Fig. 2 is a top plan view of the machine shown in Fig. 1, some parts of the machine being also shown in different positions by dot and dash lines; and Fig. 3 is an enlarged sectional view showing the connection of the tracer to its supporting arm.

Figure 1:
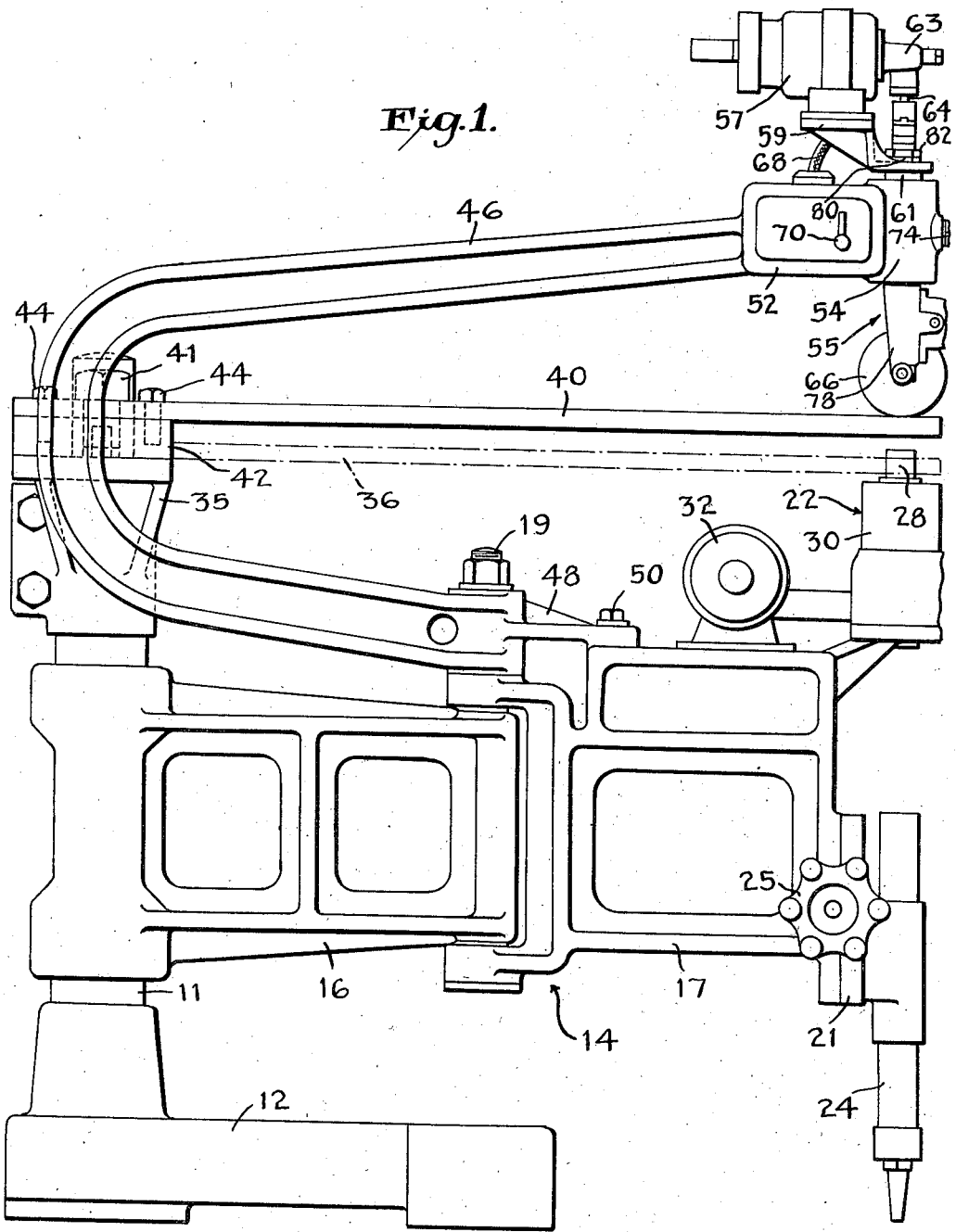
Fig. 1 is a side elevation of a cutting or welding machine embodying the invention.

A column 11 is supported by a base 12. A jointed arm 14 comprises links 16 and 17 which are pivotally connected by a bolt 19. The link 16 is supported by the column and swings freely on the column.

A torch-holder 21 and an upwardly projecting template follower 22 are carried by the link 17 and movable universally in a plane. A torch 24, supported by the torch-holder, can be moved toward and from the work by a hand wheel 25.

The template follower 22 is of the magnetic type and includes a roller 28, a solenoid 30 for magnetizing the roller to cause it to adhere to a template, and a motor 32 operatively connected to the roller to cause it to rotate and travel along the template. The column 11 has a bracket 35 near its upper end for supporting a template 36, indicated in dot and dash lines in Fig. 1. The mechanism thus far described is a conventional cutting or welding machine for guiding a torch according to the outline of a template.

A table 40 fits over the top of the column 11 and is connected to the bracket 35 by bolts 41. The table is supported above the bracket 35 by a spacing block 42, which is connected to the table 40 by screws 44. The block 42 is of sufficient thickness to hold the table above the template follower roller 28.

A curved arm 46 fits over the upper end of the bolt 19 and has a short extension 48 secured to the link 17 by screws 50. The arm 46 is thus connected to the link 17 to move as a unit therewith. The arm 46 extends some distance beyond the pivoted end of the link 17, curves upwardly around the edge of the table 40, and then extends across the top of the table 40 to a point above the template follower and torch. The arm 46 can be made as an integral part of the link 17, if desired.

The upper end of the arm 46 is formed with a switch housing 52 and a vertical bearing 54 for supporting a tracer 55. The tracer includes a motor 57 on a bracket 59, which is connected to and supported by a sleeve 61. The motor drives the tracer through reduction gearing 63, a drive shaft 64, and other gearing between the drive shaft 64 and the tracing wheel 66. Power is supplied to the tracer motor through a cable 68, and the power supply can be turned on or off by a switch 70.

Fig. 3 shows part of the tracer in detail, and its connection to the arm 46. The bearing 54 contains a bushing 72, in which the sleeve 61 is vertically movable so that the tracer has a floating movement as it travels across a drawing or print on the table. Rotation of the sleeve 61 is prevented by a screw 74 which threads through the bearing 54 and extends into a slot 76 in the sleeve 61.

The tracer wheel 66 has an axle carried by a swivel frame 78. This swivel frame has a conical bearing against the lower end of the sleeve 61 and an upper threaded end for receiving a conical nut 80, which bears against the upper end of the sleeve 61. Vertical end play of the swivel frame 78 in the sleeve 61 is taken up by screwing down the conical nut 80, which is held in set position by a lock nut 82.

The drive shaft 64 passes downward in the swivel frame 78, the axis of the drive shaft being coincident with that of the frame. Any suitable gearing connections can be used between the drive shaft 64 and the tracer wheel 66, the gearing shown in Fig. 3 being the same as in the Ragonnet patent, No. 1,735,129, dated Nov. 12, 1929.

The tracer is hand-guided over the drawing or other outline on the pattern table. The point of traction of the tracing wheel 66 is on the swivel axis of the tracer and is directly over the torch 24. Since the arm 46 is rigidly connected to the link 17, the movement of the tracer across the table 40 causes the torch 24 to move in a similar path.

The arm 46 extends for a substantial distance beyond the joint of the arm 14 to provide a deep throat so that the arm 46 will not strike the edge of the table 40 as the tracer moves across the table. Both links of the jointed arm 14 are entirely under the table 40 for most positions of the torch, but the deep throat of the arm 46 permits the tracer to move into any position on the table, back of a narrow region along the forward end of the table where it extends beyond the cutting field. A second position of the tracer and arms is shown in dot and dash lines in Fig. 2.

The shape of the arm 46 can be changed, and other changes and modifications can be made, and various features of the invention used with or without other features without departing from the invention as defined in the claims.

I claim:

1. A machine of the character described having a column, a two-part jointed arm, one portion of which is pivoted on said column while the other portion is adapted to carry a torch and a template-follower in vertical alinement, a recurved overhanging arm fixed to the outer portion of said jointed arm and adapted to carry a tracer likewise in vertical alinement with the torch, and means for supporting either a template or a pattern table on the upper portion of said column.

2. A cutting or welding machine comprising a column; means pivotally connected to the column for supporting a torch for universal movement in a plane; a pattern table carried by the column above the universal torch-supporting means; an arm secured to said supporting means and shaped to extend around the edge of the pattern table and over the top surface of said table when the torch-supporting means are entirely under said pattern table; and a tracing device carried by the arm in a position over the torch-supporting means so that a torch supported thereby moves in a path similar to that followed by the tracer as said tracer is guided over a pattern on the table.

3. A universal cutting or welding machine comprising a jointed arm pivotally supported at one end by a column; a torch-holder carried by the other end of the jointed arm; a pattern table supported by the column above the jointed arm and extending over the entire length of said jointed arm; and a tracer-supporting arm secured to the torch-holder link of the jointed arm and shaped to extend around the edge of the pattern table and over the top surface of the table for supporting a tracing device in line with a torch in the torch-holder.

4. A cutting or welding machine comprising a column; a jointed arm with a rearward link pivotally connected to the column and a forward link supporting a torch-holder for universal movement in a plane; a pattern table above the jointed arm and torch-holder; a tracer for operating over a pattern on the table; and an arm fixed to the forward link and extending beyond the joint of said jointed arm at a level higher than the rearward link, then upward outside the edge of the table and over the top of the table to the tracer.

5. A universal cutting or welding machine including a column; a jointed arm pivotally connected to the column; a torch-holder connected with the jointed arm for supporting a torch for universal movement in a plane; a pattern table supported by the column above the jointed arm and torch-holder; and a tracer-supporting arm connected to the torch-holder link of the jointed arm and extending beyond said link, then upward around the edge of the pattern table and across the top of the table to support a tracer in line with the torch-holder.

6. A cutting or welding machine comprising a torch-holder, a tracer-holder, a pattern table beneath the tracer-holder, a supporting column, a jointed arm located entirely on one side of the plane of the pattern table and having its rearward link pivotally connected with the column and carrying one of said holders at the front end of the forward link for universal movement in a plane parallel to the pattern table, a U-shaped arm connected with and supported by the forward link of the jointed arm and carrying the other of said holders at the other end and in alinement with the first holder, said U-shaped arm extending beyond the link of the jointed arm and then curving away from the jointed arm around the edge of the pattern table and then forward again on the other side of the pattern table.

JAMES L. ANDERSON.